United States Patent
Chen et al.

(10) Patent No.: US 12,400,562 B2
(45) Date of Patent: Aug. 26, 2025

(54) HEAT-SHRINKABLE POLYESTER LABEL FILM AND METHOD FOR PREPARING THEREOF

(71) Applicant: FAR EASTERN NEW CENTURY CORPORATION, Taipei (TW)

(72) Inventors: Yi-Fen Chen, Taipei (TW); Yow-An Leu, Taipei (TW); Li-Ling Chang, Taipei (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 686 days.

(21) Appl. No.: 17/870,098

(22) Filed: Jul. 21, 2022

(65) Prior Publication Data

US 2023/0045508 A1 Feb. 9, 2023

(51) Int. Cl.
*G09F 3/04* (2006.01)
*G09F 3/02* (2006.01)

(52) U.S. Cl.
CPC ............... *G09F 3/04* (2013.01); *G09F 3/02* (2013.01); *G09F 2003/0223* (2013.01); *G09F 2003/0272* (2013.01)

(58) Field of Classification Search
None
See application file for complete search history.

(56) References Cited

FOREIGN PATENT DOCUMENTS

| | | |
|---|---|---|
| EP | 0372424 A2 | 6/1990 |
| KR | 20130068928 A | 6/2013 |

OTHER PUBLICATIONS

Search Report issued to European counterpart application No. 22186277.4 by the EPO on Dec. 19, 2022.

*Primary Examiner* — James C Yager
(74) *Attorney, Agent, or Firm* — Nixon & Vanderhye PC

(57) ABSTRACT

Disclosed herein are a heat-shrinkable polyester label film and a preparation method thereof. The label film has a shrinkage force not lower than 5.5 N in at least one shrinkage direction after immersing the heat-shrinkable polyester label film in water at 55° C. for 30 seconds, and a heat shrinkage rate of not lower than 50% in the shrinkage direction after immersing the heat-shrinkable polyester label film in water at 55° C. for 240 seconds.

20 Claims, No Drawings

HEAT-SHRINKABLE POLYESTER LABEL FILM AND METHOD FOR PREPARING THEREOF

CROSS-REFERENCE TO RELATED APPLICATION

This application claims priority of Taiwanese Invention Patent Application No. 110126993, filed on Jul. 22, 2021.

FIELD

The present disclosure relates to a polyester label film and a method for preparing the same, and more particularly to a heat-shrinkable polyester label film and a method for preparing the same.

BACKGROUND

With rising awareness of environmental protection worldwide, issues such as recycling and reuse of plastic bottles and other types of containers have gained attention. A recycling process of a container generally includes removing a label film that is attached to the container. At present, most of label films widely in use are plastic label films, which are firmly attached to containers through an adhesive, such that alkaline solution treatment or immersion in hot water having a temperature of 80° C. to 90° C. is needed to effectively detach such plastic label films from the containers. Therefore, in consideration of the recycling and reuse process, development of a label film that can be easily detached from a container becomes a topic of intensive research.

U.S. Pat. No. 6,680,097 B1 discloses a film label which can be attached to a container that is reusable, and which includes a heat-shrinkable stretched plastic film layer and an adhesive layer. With the aforesaid configuration, when the container is placed into a basic washing liquid at a temperature greater than 50° C., the adhesive layer would lose its adhesive force and the stretched plastic film layer would shrink, resulting in ready detachment of the film label from the container. In addition, FIG. 3 of U.S. Pat. No. 6,680,097 B1 showed that the film label has a heat shrinkage rate of less than 10% in the machine direction at 80° C., but the heat shrinkage rate and shrinkage force upon immersion in water at 55° C. are not disclosed in U.S. Pat. No. 6,680,097 B1. Based on the premise that the heat shrinkage rate of the film label is less than 10% at 80° C., it can be reasonably expected that at a temperature lower than 80° C., e.g., from 50° C. to 60° C., such film label can hardly shrink. Since the film label would not be detached from the container at a relatively lower temperature, such poor detachment of the film label is a problem yet to be solved.

U.S. Pat. No. 9,978,291 B2 discloses a film label which is adhered to an article, and which includes a biaxially stretched polymeric film layer, a printed decoration layer, and a pressure-sensitive adhesive layer. Following immersion of the film label in a hot washing liquid at a temperature from 50° C. to 95° C., the biaxially stretched polymeric film layer has shrinkabilities of less than 65% in the machine direction and in a direction transverse to the machine direction, and a difference of the heat shrinkage rate in the machine direction from the heat shrinkage rate in the direction transverse to the machine direction which is less than 50%, as well as a shrinkage force of not greater than 3.5 $N/mm^2$ after immersion in water at 60° C. With the aforesaid configuration, the film label adhered to the article through a high adhesion force, when immersed in the hot washing liquid, could be washed off from the article without splitting caused by sharp shrinkage, or without the printed decoration layer remaining on the article. However, U.S. Pat. No. 9,978,291 B2 does not disclose the composition used for making the biaxially stretched polymeric film layer, nor does it disclose the process for preparing the biaxially stretched polymeric film layer. In addition, such patent document merely suggests that the film label is designed to have a heat shrinkage rate of less than 65% and a shrinkage force of less than 3.5 $N/mm^2$ which is measured at 60° C., and does not disclose the heat shrinkage rate and shrinkage force at 55° C.

U.S. Pat. No. 5,070,180 A discloses a shrinkable copolyester film serving as a sleeve film label for a polyethylene terephthalate (PET) container. The shrinkable polyester film includes a copolyester which is formed by a polycondensation reaction of an acid component and an alcohol component. The acid component includes 50 mol % to 99 mol % of terephthalic acid, 1 mol % to 25 mol % of an aliphatic dicarboxylic acid, and 0 mol % to 30 mol % of an aromatic dicarboxylic acid, based on the total mole of the acid component. The alcohol component includes 70 mol % to 100 mol % of ethylene glycol and 0 mol % to 30 mol % of a diol selected from the group consisting of neopentyl glycol, propylene glycol, 1,4-butanediol, trimethylene glycol, tetramethylene glycol, hexamethylene glycol, diethylene glycol, polyalkylene glycol, and 1,4-cyclohexane dimethanol, based on the total mole of the alcohol component. The shrinkable copolyester film has a heat shrinkage rate of not less than 30% at 100° C., and a glass transition temperature ranging from 35° C. to 65° C. The shrinkable copolyester film, when sleeved on a PET container, can shrink evenly, is substantially free from wrinkles and distortion, and can be firmly attached to the PET container. However, such shrinkable copolyester film is not utilized as an adhesive film label, and how the shrinkable copolyester film is detached from the PET container is not known.

JP 3829353 B2 discloses a heat-shrinkable polyester film serving as a sleeve film label. The heat-shrinkable polyester film includes a polyester which is formed by a polycondensation reaction of a dicarboxylic acid component, a diol component, and other components. The dicarboxylic acid component includes not lower than 70 mol % of terephthalic acid, and the diol component includes not lower than 70 mol % of ethylene glycol. The other components include at least one of adipic acid, isophthalic acid, butylene glycol, and neopentyl glycol. The heat-shrinkable polyester film has a maximum shrinkage force ranging from 0.5 $kg/mm^2$ to 1.2 $kg/mm^2$, a heat shrinkage rate of not greater than 40%, which is measured by immersing the heat-shrinkable polyester film in hot water at 75° C. for 10 seconds, and a heat shrinkage rate of not lower than 50%, which is measured by immersing the heat-shrinkable polyester film in hot water at 95° C. for 10 seconds. The heat-shrinkable polyester film, when sleeved on a container, has good shrinkage properties (i.e., uniform shrinkage, and unlikelihood of producing wrinkles or shrinkage spots) and an excellent impact resistance against breakage. However, the heat-shrinkable polyester film is not utilized as an adhesive film label, and how the heat-shrinkable polyester film is detached from the container is not known, much less the heat shrinkage rate and the shrinkage force upon immersion of the heat-shrinkable polyester film in water at 55° C.

CN 112679709 A discloses a polyester for making a heat-shrinkable film. The polyester includes 3 wt % to 8 wt % of a dicarboxylic acid, 5 wt % to 15 wt % of an aliphatic diol, 0.001 wt % to 0.003 wt % of a hydrophilic modifier, 0.0001 wt % to 0.0005 wt % of an antioxidant heat stabilizer, and the balance being a mixture of terephthalic acid or a derivative thereof and ethylene glycol with a molar ratio of 1:1.0 to 1:2.5. Although the heat-shrinkable film made from the polyester has a high heat shrinkage rate, CN 112679709 A does not disclose how the heat-shrinkable film can be detached from a container after immersion in hot water at lower than 80° C., much less the heat shrinkage rate and shrinkage force upon immersion in water at 55° C.

US 2013/0011587 A1 discloses a heat-shrinkable polyester-based film for attachment to a container, which includes a polyester-based resin matrix and resins dispersed in the polyester-based resin matrix. The polyester-based resin matrix includes a copolyester which is formed by a polycondensation reaction of a dicarboxylic acid component and a diol component. The dicarboxylic acid component includes not lower than 80 mol % of terephthalic acid, and the diol component includes ethylene glycol and 14 mol % to 24 mol % of another diol different from ethylene glycol. The heat-shrinkable polyester-based film has an opacity of 20% to 70%, and a heat shrinkage rate of 40% to 80% in a maximum shrinking direction upon immersion in hot water at 90° C. for 10 seconds. Although the heat-shrinkable polyester-based film attached to a container could be detached therefrom upon immersion in hot water at 80° C., US 2013/0011587 A1 does not disclose how the heat-shrinkable polyester-based film can be detached from the container in water at a temperature lower than 80° C., much less the heat shrinkage rate and shrinkage force upon immersion in water at 55° C.

U.S. Pat. No. 8,815,994 B2 discloses a heat-shrinkable polyester-based single-layer film which includes a polyester-based resin matrix and resins dispersed in the polyester-based resin matrix. The polyester-based resin matrix includes a copolyester which is formed by a polycondensation reaction of a dicarboxylic acid component and a diol component. The dicarboxylic acid component includes at least one of terephthalic acid and dimethyl terephthalate, and the diol component includes ethylene glycol and 2,2-dimethyl(1,3-propane)diol. The heat-shrinkable polyester-based single-layer film has a haze of 80% to 95%, and a heat shrinkage rate of 40% to 80% in a maximum shrinking direction upon immersion in hot water at 90° C. for 10 seconds. Although the heat-shrinkable polyester-based single-layer film attached to a container can be peeled off after immersion in hot water at 80° C., U.S. Pat. No. 8,815,994 B2 does not disclose how the heat-shrinkable polyester-based single-layer film could be detached from the container in water at a temperature lower than 80° C., much less the heat shrinkage rate and shrinkage force upon immersion in water at 55° C.

SUMMARY

Therefore, in a first aspect, the present disclosure provides a heat-shrinkable polyester label film which can alleviate at least one of the drawbacks of the prior art.

The heat-shrinkable polyester label film has: a shrinkage force of not lower than 5.5 N in at least one shrinkage direction after immersing the heat-shrinkable polyester label film in water at 55° C. for 30 seconds; and a heat shrinkage rate of not lower than 50% in the shrinkage direction after immersing the heat-shrinkable polyester label film in water at 55° C. for 240 seconds.

In a second aspect, the present disclosure provides another heat-shrinkable polyester label film which can alleviate at least one of the drawbacks of the prior art.

The heat-shrinkable polyester label film includes a polyester material made of at least one polyester-forming composition which includes a dibasic carboxylic mixture and a diol mixture. The heat-shrinkable polyester label film has a glass transition temperature ranging from 50° C. to 65° C., an enthalpy not greater than 15 J/g, and a shrinkage force not lower than 5.5 N in at least one shrinkage direction, after immersing the heat-shrinkable polyester label film in water at 55° C. for 30 seconds. The dibasic carboxylic mixture includes a dibasic carboxylic compound and a chain hydrocarbon dicarboxylic acid compound. The dibasic carboxylic compound is one of terephthalic acid and dimethyl terephthalate. The chain hydrocarbon dicarboxylic acid compound is present in an amount greater than 0 mol % and not greater than 7 mol %, based on a total molar amount of the dibasic carboxylic mixture. The diol mixture includes ethylene glycol and a diol component that is free from ethylene glycol.

In a third aspect, the present disclosure provides a method for preparing a heat-shrinkable polyester label film which can alleviate at least one of the drawbacks of the prior art.

The method includes:

(a) providing a polyester material made of a polyester-forming composition that includes a dibasic carboxylic mixture and a diol mixture, wherein the dibasic carboxylic mixture includes a dibasic carboxylic compound and a chain hydrocarbon dicarboxylic acid compound, the dibasic carboxylic compound being one of terephthalic acid and dimethyl terephthalate, the chain hydrocarbon dicarboxylic acid compound being present in an amount greater than 0 mol % and not greater than 7 mol %, based on a total molar amount of the dibasic carboxylic mixture, and wherein the diol mixture includes ethylene glycol and a diol component that is free from ethylene glycol;

(b) subjecting the polyester material to a melting treatment and an extruding treatment in sequence, so as to obtain a sheet; and (c) subjecting the sheet to preheating, stretching, and annealing treatments in sequence, so as to obtain the heat-shrinkable polyester label film, the annealing treatment being performed at a glass transition temperature of the sheet −5° C. to the glass transition temperature of the sheet +10° C.

In a fourth aspect, the present disclosure provides a container, which can alleviate at least one of the drawbacks of the prior art, and which includes a container body and the aforesaid heat-shrinkable polyester label film that is attached to the container body.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides a heat-shrinkable polyester label film including a polyester material made of a polyester-forming composition which includes a dibasic carboxylic mixture and a diol mixture. The heat-shrinkable polyester label film has a glass transition temperature ranging from 50° C. to 65° C., an enthalpy not greater than 15 J/g, and a shrinkage force not lower than 5.5 N in at least one shrinkage direction, after immersing the heat-shrinkable polyester label film in water at 55° C. for 30 seconds.

The dibasic carboxylic mixture includes a dibasic carboxylic compound and a chain hydrocarbon dicarboxylic acid compound. The dibasic carboxylic compound is one of terephthalic acid and dimethyl terephthalate. The chain hydrocarbon dicarboxylic acid compound is present in an amount greater than 0 mol % and not greater than 7 mol %, based on a total molar amount (i.e., 100 mol %) of the dibasic carboxylic mixture.

The diol mixture includes ethylene glycol and a diol component that is free from ethylene glycol.

In certain embodiments, the heat-shrinkable polyester label film has a glass transition temperature ranging from 56° C. to 62° C., so that the heat-shrinkable polyester label film is conferred with a more satisfactory detachability.

According to the present disclosure, the enthalpy may be adjusted by altering the components, amount, and process conditions of the polyester-forming composition. In certain embodiments, the enthalpy may range from 5 J/g to 13 J/g.

As used herein, the term "shrinkage direction" refers to a machine direction (MD) or a direction transverse to the machine direction (i.e., (TD)). In certain embodiments, the heat-shrinkable polyester label film may have a shrinkage force from 5.5 N to 10 N in the shrinkage direction after immersing the heat-shrinkable polyester label film in water at 55° C. for 30 seconds, so that the heat-shrinkable polyester label film is conferred with a more satisfactory detachability.

In certain embodiments, the heat-shrinkable polyester label film may have a heat shrinkage rate of not greater than 3.2% in the shrinkage direction after aging, after placing the heat-shrinkable polyester label film at 40° C. and a relative humidity of 40% for 672 hours and allowing the heat-shrinkable polyester label film to naturally shrink. In other embodiments, the heat shrinkage rate in the shrinkage direction after aging ranges from 0.1% to not greater than 3.2%.

In certain embodiments, the heat-shrinkable polyester label film may have a heat shrinkage rate of not lower than 50% in the shrinkage direction, after immersing the heat-shrinkable polyester label film in water at 55° C. for 240 seconds. In other embodiments, the heat-shrinkable polyester label film may have at least one property selected from the group consisting of a heat shrinkage rate of not lower than 5% in the shrinkage direction, after immersing the heat-shrinkable polyester label film in water at 55° C. for 10 seconds, and a shrinkage of not lower than 20% in the shrinkage direction, after immersing the heat-shrinkable polyester label film in water at 55° C. for 30 seconds.

In certain embodiments, the heat-shrinkable polyester label film may have a heat shrinkage rate of not lower than 65% in the shrinkage direction, after immersing the heat-shrinkable polyester label film in water at 95° C. for 10 seconds.

In certain embodiments, the chain hydrocarbon dicarboxylic acid compound is selected from the group consisting of a linear hydrocarbon dicarboxylic acid compound, a branched hydrocarbon dicarboxylic acid compound, and a combination thereof. The linear hydrocarbon dicarboxylic acid compound may be selected from the group consisting of adipic acid, succinic acid, azelaic acid, and combinations thereof. The chain hydrocarbon dicarboxylic acid compound may be present in an amount ranging from 1 mol % to 7 mol %, based on a total molar amount (i.e., 100 mol %) of the dibasic carboxylic mixture.

Examples of the diol component may include, but are not limited to, an aliphatic diol component and an aromatic diol component. Examples of the aliphatic diol component may include, but are not limited to, a diol having a linear hydrocarbon group or a linear hydrocarbon oxy group, and a branched alkyl diol. In certain embodiments, the diol component is selected from the group consisting of a diol having a linear hydrocarbon group or a linear hydrocarbon oxy group, a branched alkyl diol, and a combination thereof. The diol having a linear hydrocarbon group or a linear hydrocarbon oxy group may be selected from the group consisting of 1,4-butanediol, 1,3-propanediol, hexanediol, diethylene glycol, triethylene glycol, polyethylene glycol, and combinations thereof. The branched alkyl diol may be selected from the group consisting of neopentyl glycol, 2-methyl-1,3-propanediol, 2-butyl-2-ethyl-1,3-propanediol, and combinations thereof. The diol component may be present in an amount not lower than 30 mol %, based on a total molar amount (i.e., 100 mol %) of the diol mixture. In certain embodiments, the diol component is present in an amount ranging from 30 mol % to 40 mol %, based on the total molar amount of the diol mixture.

Besides including the aforesaid polyester-forming composition and achieving the aforesaid glass transition temperature, melting enthalpy, shrinkage force and heat shrinkage rate so as to enable detachment from a container upon immersion in a washing liquid at a temperature of greater than 50° C. (i.e., so as to accomplish an excellent detachability), the present disclosure also provides another heat-shrinkable polyester label film that can accomplish the aforesaid goal. The another heat-shrinkable polyester label film has a shrinkage force of not lower than 5.5 N in at least one shrinkage direction, after immersing the heat-shrinkable polyester label film in water at 55° C. for 30 seconds, and a heat shrinkage rate of not lower than 50% in the shrinkage direction, after immersing the heat-shrinkable polyester label film in water at 55° C. for 240 seconds.

In certain embodiments, the another heat-shrinkable polyester label film may have a heat shrinkage rate of not lower than 5% in the shrinkage direction, after immersing the heat-shrinkable polyester label film in water at 55° C. for 10 seconds, and a heat shrinkage rate of not lower than 20% in the shrinkage direction after immersing the heat-shrinkable polyester label film in water at 55° C. for 30 seconds.

The present disclosure also provides a method for preparing the heat-shrinkable polyester label film firstly described above, which includes steps (a) to (c).

In step (a), the polyester material made of the polyester-forming composition is provided.

In step (b), the polyester material is subjected to a melting treatment and an extruding treatment in sequence, so as to obtain a sheet.

In step (c), the sheet is subjected to preheating, stretching, and annealing treatments in sequence, so as to obtain the heat-shrinkable polyester label film. The annealing treatment is performed at a glass transition temperature of the sheet −5° C. to the glass transition temperature of the sheet +10° C.

According to the present disclosure, the sheet in step (b) may have a thickness similar to that of a conventional sheet for forming a heat-shrinkable polyester label film, or a thickness that is adjusted according to the requirement for an object to be applied with the heat-shrinkable polyester label film. In certain embodiments, the sheet may have a thickness of not greater than 1 mm. In other embodiments, the sheet may have a thickness ranging from 150 µm to 500 µm. In yet other embodiments, the sheet may have a thickness ranging from 190 µm to 275 µm.

In certain embodiments, the melting treatment may be performed at a temperature ranging from 210° C. to 260° C.

According to the present disclosure, in step (c), the preheating treatment is intended to soften the sheet obtained in step (b), so that the stretching treatment can be facilitated subsequently. The temperature of the preheating treatment may be adjusted according to the material of the sheet and the conditions of the stretching treatment.

In certain embodiments, the preheating treatment may be performed at a temperature ranging from 60° C. to 120° C. In certain embodiments, the stretching treatment may be performed at a temperature ranging from 30° C. to 100° C.

In certain embodiments, in step (c), the stretching treatment may be performed by stretching the sheet in the MD or the TD. The stretching treatment may be performed at a stretch ratio of 3 to 7. In some embodiments, the stretching treatment may be performed at a stretch ratio of 4 to 6.

In certain embodiments, in step (c), the stretching treatment may be performed by stretching the sheet in two directions, one of which is the MD, and the other one of which is the TD. The stretching treatment in one of the two directions may be performed at a stretch ratio ranging from greater than 1 to 2, and the stretching treatment in the other one of the two directions may be performed at a stretch ratio of 3 to 7. In some embodiments, the stretching treatment in one of the two directions may be performed at a stretch ratio ranging from greater than 1 to 1.4, and the stretching treatment in the other one of the two directions may be performed at a stretch ratio of 4 to 6.

The present disclosure also provides a container including a container body and the heat-shrinkable polyester label film which is firstly or secondly described above, and which is attached to the container body. The container may be made of a material such as glass, polymer, etc.

The present disclosure will be further described by way of the following examples. However, it should be understood that the following examples are intended solely for the purpose of illustration and should not be construed as limiting the present disclosure in practice.

EXAMPLES

Preparation of Polyester Resins
PE1 Polyester Resins

An acid component containing 100 mol % of terephthalic acid, an alcohol component containing 78.7 mol % of ethylene glycol and 21.3 mol % of neopentyl glycol, and 300 ppm of tetraethylammonium hydroxide were mixed to obtain a mixture. The mixture was heated to 250° C. and then subjected to an esterification reaction under a nitrogen atmosphere. When the amount of distilled water reached the theoretical value of the esterification reaction, 340 ppm of ethylene glycol antimony (serving as a catalyst) and 100 ppm of trimethyl phosphate (serving as a heat stabilizer) were added, followed by performing a polymerization reaction at 275° C. under a vacuum atmosphere, so as to obtain PE1 polyester resins.

PE2 Polyester Resins

Polybutylene terephthalate resins purchased from Chang Chun Plastics Co., Ltd. (Catalogue No: 1100-211D) were used as PE2 polyester resins.

PE3 Polyester Resins

An acid component containing 73.0 mol % of terephthalic acid and 27.0 mol % of adipic acid, an alcohol component containing 100 mol % of ethylene glycol, and 300 ppm of tetraethylammonium hydroxide were mixed to obtain a mixture. The mixture was heated to 250° C. and then subjected to an esterification reaction under a nitrogen atmosphere. When the amount of distilled water reached the theoretical value of the esterification reaction, 340 ppm of ethylene glycol antimony (serving as a catalyst) and 100 ppm of trimethyl phosphate (serving as a heat stabilizer) were added, followed by performing a polymerization reaction at 275° C. under a vacuum atmosphere, so as to obtain PE3 polyester resins.

PE4 Polyester Resins

An acid component containing 95.6 mol % of terephthalic acid and 4.4 mol % of adipic acid, an alcohol component containing 69.2 mol % of ethylene glycol, 14.3 mol % of neopentyl glycol and 16.5 mol % of 1,4-butanediol, and 300 ppm of tetraethylammonium hydroxide were mixed to obtain a mixture. The mixture was heated to 250° C. and then subjected to an esterification reaction under a nitrogen atmosphere. When the amount of distilled water reached the theoretical value of the esterification reaction, 930 ppm of tetrabutyl titanate (serving as a catalyst) and 100 ppm of trimethyl phosphate (serving as a heat stabilizer) were added, followed by performing a polymerization reaction at 275° C. under a vacuum atmosphere, so as to obtain PE4 polyester resins.

PE5 Polyester Resins

An acid component containing 100 mol % of terephthalic acid, an alcohol component containing 75.0 mol % of ethylene glycol, 20.0 mol % of neopentyl glycol and 5.0 mol % of diethylene glycol, and 300 ppm of tetraethylammonium hydroxide were mixed to obtain a mixture. The mixture was heated to 250° C. and then subjected to an esterification reaction under a nitrogen atmosphere. When the amount of distilled water reached the theoretical value of the esterification reaction, 340 ppm of ethylene glycol antimony (serving as a catalyst) and 100 ppm of trimethyl phosphate (serving as a heat stabilizer) were added, followed by performing a polymerization reaction at 275° C. under a vacuum atmosphere, so as to obtain PE5 polyester resins.

PE6 Polyester Resins

The procedures and conditions for preparing the PE6 polyester resins were generally similar to those for the PE1 polyester resins, except that the ingredients of the acid component and the diol component were modified, as shown in Table 2.

PE7 Polyester Resins

The procedures and conditions for preparing the PE7 polyester resins were generally similar to those for the PE4 polyester resins, except that the ingredients of the acid component and the diol component were modified, as shown in Table 2.

PE8 Polyester Resins

The procedures and conditions for preparing the PE8 polyester resins were generally similar to those for the PE1 polyester resins, except that the ingredients of the acid component and the diol component were modified, as shown in Table 2.

PE9 Polyester Resins

The procedures and conditions for preparing the PE9 polyester resins were generally similar to those for the PE4 polyester resins, except that the ingredients of the acid component and the diol component were modified, as shown in Table 2.

PE10 Polyester Resins

The procedures and conditions for preparing the PE10 polyester resins were generally similar to those for the PE1 polyester resins, except that the ingredients of the acid component and the diol component were modified, as shown in Table 2.

The ingredients for preparing the PE1 to PE5 polyester resins are shown in Table 1, and those for preparing the PE6 to PE10 polyester resins are shown in Table 2.

Property Evaluation for Polyester Resins

1. Intrinsic Viscosity

The intrinsic viscosity of the PE1 to PE10 polyester resins was determined according to ASTM D4603 (published in 2003). Briefly, 0.25±0.0025 g of the polyester resins were mixed with 25 mL of a solvent containing 60 wt % of phenol and 40 wt % of 1,1,2,2-tetrachloroethane, so as to form a mixture. Next, the mixture was heated at 110° C.±10° C. for 1 hour, followed by cooling to obtain a test sample. The test sample was subjected to measurement at 25° C. using an Ostwald viscometer, and the intrinsic viscosity was then calculated using the Huggins equation. The results are shown in Tables 1 and 2.

2. Glass Transition Temperature (Tg)

The PE1 to PE10 polyester resins were subjected to glass transition temperature analysis using a differential scanning calorimeter (DSC) (Manufacturer: TA Instruments, Inc.; Model: 2910 Modulated DSC™). A test temperature was raised from −50° C. to 300° C. at a heating rate of 10° C./minute. The results are shown in Tables 1 and 2.

TABLE 1

| | | Polyester resins | | | | |
|---|---|---|---|---|---|---|
| | | PE1 | PE2 | PE3 | PE4 | PE5 |
| Acid component (mol %) | Terephthalic acid | 100 | 100 | 73 | 95.6 | 100 |
| | Adipic acid | 0 | 0 | 27 | 4.4 | 0 |
| Diol component (mol %) | Ethylene glycol | 78.7 | 0 | 100 | 69.2 | 75 |
| | Neopentyl glycol | 21.3 | 0 | 0 | 14.3 | 20 |
| | 1,4-butanediol | 0 | 100 | 0 | 16.5 | 0 |
| | Diethylene glycol | 0 | 0 | 0 | 0 | 5 |
| Tetraethylammonium hydroxide (TEAH) (ppm) | | 300 | — | 300 | 300 | 300 |
| Polymerization catalyst (ppm) | Ethylene glycol antimony | 340 | — | 340 | 0 | 340 |
| | Tetrabutyl titanate | 0 | — | 0 | 930 | 0 |
| Heat stabilizer (ppm) | Trimethyl phosphate | 100 | — | 100 | 100 | 100 |
| Property evaluation | Intrinsic viscosity (dL/g) | 0.67 | 0.75 | 0.71 | 0.68 | 0.69 |
| | Glass transition temperature (° C.) | 75 | 45 | 27 | 57 | 73 |

Amount of TEAH (ppm): TEAH (mg) ÷ polyester resins (kg)

Amount of catalyst (ppm): catalyst (g) ÷ polyester resins (kg)

Amount of heat stabilizer (ppm): heat stabilizer (g) ÷ polyester resins (kg)

"—": not applied

TABLE 2

| | | Polyester resins | | | | |
|---|---|---|---|---|---|---|
| | | PE6 | PE7 | PE8 | PE9 | PE10 |
| Acid component (mol %) | Terephthalic acid | 97.1 | 98.4 | 94.2 | 95.6 | 86 |
| | Adipic acid | 0 | 1.6 | 0 | 0 | 0 |
| | Succinic acid | 2.9 | 0 | 0 | 0 | 0 |
| | Azelaic acid | 0 | 0 | 5.8 | 0 | 0 |
| | Isophthalic acid | 0 | 0 | 0 | 4.4 | 0 |
| | Dodecanedioic acid | 0 | 0 | 0 | 0 | 14 |
| Diol component (mol %) | Ethylene glycol | 68 | 69.1 | 68 | 69.2 | 100 |
| | Neopentyl glycol | 0 | 15.4 | 0 | 14.3 | 0 |
| | 1,4-butanediol | 0 | 15.5 | 0 | 16.5 | 0 |
| | Diethylene glycol | 0 | 0 | 16.6 | 0 | 0 |
| | 2-methyl-1,3-propanediol | 15.4 | 0 | 0 | 0 | 0 |
| | 2-ethyl-2-butyl-1,3-propanediol | 0 | 0 | 15.4 | 0 | 0 |
| | 1,6-hexanediol | 16.6 | 0 | 0 | 0 | 0 |

TABLE 2-continued

|  |  | Polyester resins | | | | |
|---|---|---|---|---|---|---|
|  |  | PE6 | PE7 | PE8 | PE9 | PE10 |
| Tetraethylammonium hydroxide (TEAH) (ppm) | | 300 | 300 | 300 | 300 | 300 |
| Polymerization catalyst (ppm) | Ethylene glycol antimony | 340 | 0 | 340 | 0 | 340 |
| | Tetrabutyl titanate | 0 | 930 | 0 | 930 | 0 |
| Heat stabilizer (ppm) | Trimethyl phosphate | 100 | 100 | 100 | 100 | 100 |
| Property evaluation | Intrinsic viscosity (dL/g) | 0.70 | 0.68 | 0.70 | 0.71 | 0.68 |
| | Glass transition temperature (° C.) | 58 | 62 | 51 | 66 | 50 |

Amount of TEA hydroxide (ppm): TEA hydroxide (mg) ÷ polyester resins (kg)
Amount of catalyst (ppm): catalyst (g) ÷ polyester resins (kg)
Amount of heat stabilizer (ppm): heat stabilizer (g) ÷ polyester resins (kg)

Preparation of Heat-Shrinkable Polyester Label Film

Example 1 (EX1)

The PE1 to PE3 polyester resins were dried until the moisture content thereof was not greater than 200 ppm, so as to obtain dried PE1 to PE3 polyester resins. Next, a polyester particle mixture was obtained by mixing, based on a total weight (i.e., 100 wt %) of the polyester particle mixture, 72 wt % of the dried PE1 polyester resins, 18 wt % of the dried PE2 polyester resins, and 10 wt % of the dried PE3 polyester resins. Thereafter, the polyester particle mixture was subjected to a melting treatment using a twin-screw extruder at 210° C. to 260° C., and then the resultant molten polyester particle mixture was extruded from a T-die, followed by winding on a rotating metal roller having a surface temperature of 30° C. for cooling, so as to obtain a polyester sheet that is not yet stretched with a thickness of 275 μm. Such polyester sheet was subjected to a first preheating treatment by passing through a pre-heating roller at 66° C., and then was subjected to a first stretching treatment along a machine direction at a stretch ratio of 1.4 (i.e., utilizing the difference of rotation speed between a first rotating roller having a temperature of 66° C. and a rotation speed of 33.5 m/min and a second rotating roller having a temperature of 30° C. and a rotation speed of 47.0 m/min), followed by a cooling treatment with a cooling roller at 30° C., so as to obtain a stretched polyester film.

Subsequently, through a stretching machine and at a rate of 47 m/min, the stretched polyester film was subjected to a second preheating treatment at 92° C., and then was subjected to a second stretching treatment along a direction that is transverse to the machine direction at a stretch ratio of 4.9 and a temperature of 70° C., followed by an annealing treatment at 60° C., thereby obtaining a heat-shrinkable polyester label film of EX1 having a thickness of 40 μm.

Example 2 (EX2)

The procedure for preparing the heat-shrinkable polyester label film of EX2 was similar to that for EX1, except that the polyester sheet that was not yet stretched had a thickness of 196 μm, and was not subjected to the first preheating treatment, the first stretching treatment and the cooling treatment.

Example 3 (EX3)

The procedure for preparing the heat-shrinkable polyester label film of EX3 was similar to that for EX1, except that the polyester particle mixture was formed by mixing 67 wt % of the dried PE1 polyester resins, 18 wt % of the dried PE2 polyester resins, and 10 wt % of the dried PE3 polyester resins, based on the total weight of the polyester particle mixture. In addition, the first preheating treatment was performed at 62° C., the first rotating roller had a temperature of 62° C., and the second stretching treatment was performed at 67° C.

Example 4 (EX4)

The procedure for preparing the heat-shrinkable polyester label film of EX4 was similar to that for EX3, except that the PE4 polyester resins were dried until the moisture content thereof was not greater than 200 ppm to obtain the dried PE4 polyester resins, which were not mixed with other types of dried polyester resins (i.e., the formation of the polyester particle mixture was dispensed with), and which were then subjected to the melting treatment.

Example 5 (EX5)

The procedure for preparing the heat-shrinkable polyester label film of EX5 was similar to that for EX4, except that the not yet stretched polyester sheet had a thickness of 196 μm, and was not subjected to the first preheating treatment, the first stretching treatment and the cooling treatment.

Example 6 (EX6)

The procedure for preparing the heat-shrinkable polyester label film of EX6 was similar to that for EX1, except that the polyester particle mixture was formed by mixing 55 wt % of the dried PE1 polyester resins, 21 wt % of the dried PE2 polyester resins, and 24 wt % of the dried PE3 polyester resins, based on the total weight of the polyester particle mixture. In addition, the first preheating treatment was performed at 55° C., the first rotating roller had a temperature of 55° C., and the second preheating treatment, the second stretching treatment and the annealing treatment were respectively performed at 88° C., 62° C., and 57° C.

Example 7 (EX7)

The procedure for preparing the heat-shrinkable polyester label film of EX7 was similar to that for EX3, except that the PE6 polyester resins were dried until the moisture content thereof was not greater than 200 ppm to obtain the dried PE6 polyester resins, which were not mixed with other types of dried polyester resins (i.e., the formation of the polyester particle mixture was dispensed with), and which were subjected to the melting treatment.

Example 8 (EX8)

The procedure for preparing the heat-shrinkable polyester label film of EX8 was similar to that for EX1, except that the PE7 polyester resins were dried until the moisture content thereof was not greater than 200 ppm to obtain the dried PE7 polyester resins, which were not mixed with other types of dried polyester resins (i.e., the formation of the polyester particle mixture was dispensed with), and which were then subjected to the melting treatment.

Example 9 (EX9)

The procedure for preparing the heat-shrinkable polyester label film of EX9 was similar to that for EX6, except that the PE8 polyester resins were dried until the moisture content thereof was not greater than 200 ppm to obtain the dried PE8 polyester resins, which were not mixed with other types of dried polyester resins (i.e., the formation of the polyester particle mixture was dispensed with), and which were then subjected to the melting treatment.

The polyester-forming composition for preparing each of the heat-shrinkable polyester label films of EX1 to EX9 is shown in Table 3, and the preparation parameters and conditions for each of the heat-shrinkable polyester label films of EX1 to EX9 are shown in Table 4.

Comparative Example 1 (CE1)

The procedure for preparing the heat-shrinkable polyester label film of CE1 was similar to that for EX5, except that only PE1 polyester resin were used. In addition, the second preheating treatment, the second stretching treatment and the annealing treatment were respectively performed at 98° C., 83° C., and 76° C.

Comparative Example 2 (CE2)

The procedure for preparing the heat-shrinkable polyester label film of CE2 was similar to that for EX5, except that the polyester particle mixture was formed by mixing 90 wt % of the dried PE1 polyester resins and 10 wt % of the dried PE3 polyester resins, based on the total weight of the polyester particle mixture. In addition, the second preheating treatment, the second stretching treatment and the annealing treatment were respectively performed at 92° C., 77° C., and 70° C.

Comparative Example 3 (CE3)

The procedure for preparing the heat-shrinkable polyester label film of CE3 was similar to that for EX1, except that the PE5 polyester resins were dried until the moisture content thereof was not greater than 200 ppm to obtain the dried PE5 polyester resins. Thereafter, the polyester particle mixture was obtained by mixing 18 wt % of the dried PE2 polyester resins and 82 wt % of the dried PE5 polyester resins, based on the total weight of the polyester particle mixture.

Comparative Example 4 (CE4)

The procedure for preparing the heat-shrinkable polyester label film of CE4 was similar to that for EX2, except that the polyester particle mixture was formed by mixing 65 wt % of the dried PE1 polyester resins and 35 wt % of the dried PE2 polyester resins, based on the total weight of the polyester particle mixture.

Comparative Example 5 (CE5)

The procedure for preparing the heat-shrinkable polyester label film of CE5 was similar to that for EX1, except that the polyester particle mixture was formed by mixing 70 wt % of the dried PE1 polyester resins and 30 wt % of the dried PE3 polyester resins, based on the total weight of the polyester particle mixture. In addition, the not yet stretched polyester sheet was subjected to the first stretching treatment along the machine direction at a stretch ratio of 1.25 so as to obtain the stretched polyester film.

Comparative Example 6 (CE6)

The procedure for preparing the heat-shrinkable polyester label film of CE6 was similar to that for EX3, except that the second stretching treatment and the annealing treatment were respectively performed at 75° C. and 70° C.

Comparative Example 7 (CE7)

The procedure for preparing the heat-shrinkable polyester label film of CE7 was similar to that for CE2, except that the PE9 polyester resins were dried until the moisture content thereof was not greater than 200 ppm to obtain the dried PE9 polyester resins, which were not mixed with other types of dried polyester resins (i.e., the formation of the polyester particle mixture was dispensed with), and which were then subjected to the melting treatment.

Comparative Example 8 (CE8)

The procedure for preparing the heat-shrinkable polyester label film of CE8 was similar to that for EX6, except that the PE10 polyester resins were dried until the moisture content thereof was not greater than 200 ppm to obtain the dried PE10 polyester resins, which were not mixed with other types of dried polyester resins (i.e., the formation of the polyester particle mixture was dispensed with), and which were then subjected to the melting treatment.

The polyester-forming composition for preparing each of the heat-shrinkable polyester label films of CE1 to CE8 is shown in Table 5, and the preparation parameters and conditions for each of the heat-shrinkable polyester label films of CE1 to CE8 are shown in Table 6.

TABLE 3

|  |  | Heat-shrinkable polyester label film | | | | | | | | |
|---|---|---|---|---|---|---|---|---|---|---|
|  |  | EX1 | EX2 | EX3 | EX4 | EX5 | EX6 | EX7 | EX8 | EX9 |
| Polyester | PE1 | 72 | 72 | 67 | 0 | 0 | 55 | 0 | 0 | 0 |
| resins | PE2 | 18 | 18 | 18 | 0 | 0 | 21 | 0 | 0 | 0 |
| (wt %) | PE3 | 10 | 10 | 15 | 0 | 0 | 24 | 0 | 0 | 0 |
|  | PE4 | 0 | 0 | 0 | 100 | 100 | 0 | 0 | 0 | 0 |

TABLE 3-continued

| | | | Heat-shrinkable polyester label film | | | | | | | | |
|---|---|---|---|---|---|---|---|---|---|---|---|
| | | | EX1 | EX2 | EX3 | EX4 | EX5 | EX6 | EX7 | EX8 | EX9 |
| | PE5 | | 0 | 0 | 0 | 0 | 0 | 0 | 0 | 0 | 0 |
| | PE6 | | 0 | 0 | 0 | 0 | 0 | 0 | 100 | 0 | 0 |
| | PE7 | | 0 | 0 | 0 | 0 | 0 | 0 | 0 | 100 | 0 |
| | PE8 | | 0 | 0 | 0 | 0 | 0 | 0 | 0 | 0 | 100 |
| Dibasic carboxylic mixture (mol %) | Terephthalic acid | | 97.1 | 97.1 | 95.6 | 95.6 | 95.6 | 93.0 | 97.1 | 98.4 | 94.2 |
| | Adipic acid | | 2.9 | 2.9 | 4.4 | 4.4 | 4.4 | 7.0 | 0 | 1.6 | 0 |
| | Succinic acid | | 0 | 0 | 0 | 0 | 0 | 0 | 2.9 | 0 | 0 |
| | Azelaic acid | | 0 | 0 | 0 | 0 | 0 | 0 | 0 | 0 | 5.8 |
| Diol mixture (mol %) | Ethylene glycol | | 68.0 | 68.0 | 69.2 | 69.2 | 69.2 | 69.1 | 68.0 | 69.1 | 68.0 |
| | Diol component | Neopentyl glycol | 15.4 | 15.4 | 14.3 | 14.3 | 14.3 | 11.7 | 0 | 15.4 | 0 |
| | | 1,4-butanediol | 16.6 | 16.6 | 16.5 | 16.5 | 16.5 | 19.2 | 0 | 15.5 | 0 |
| | | Diethylene glycol | 0 | 0 | 0 | 0 | 0 | 0 | 0 | 0 | 16.6 |
| | | 2-methyl-1,3-propanediol | 0 | 0 | 0 | 0 | 0 | 0 | 15.4 | 0 | 0 |
| | | 2-ethyl-2-butyl-1,3-propanediol | 0 | 0 | 0 | 0 | 0 | 0 | 0 | 0 | 15.4 |
| | | 1,6-hexanediol | 0 | 0 | 0 | 0 | 0 | 0 | 16.6 | 0 | 0 |
| | | Total amount | 32.0 | 32.0 | 30.8 | 30.8 | 30.8 | 30.9 | 32.0 | 30.9 | 32.0 |

TABLE 4

| | | Heat-shrinkable polyester label film | | | | | | | | |
|---|---|---|---|---|---|---|---|---|---|---|
| | | EX1 | EX2 | EX3 | EX4 | EX5 | EX6 | EX7 | EX8 | EX9 |
| Not yet stretched polyester film | Thickness (μm) | 275 | 196 | 275 | 275 | 196 | 275 | 196 | 196 | 196 |
| | Glass transition temperature (° C.) | 60 | 60 | 57 | 57 | 57 | 50 | 58 | 62 | 51 |
| Stretching in machine direction | Pre-heating roller temperature (° C.) | 66 | — | 62 | 62 | — | 55 | 62 | 66 | 55 |
| | First rotating roller temperature (° C.) | 66 | — | 62 | 62 | — | 55 | 62 | 66 | 55 |
| | Second rotating roller temperature (° C.) | 30 | — | 30 | 30 | — | 30 | 30 | 30 | 30 |
| | Stretching ratio | 1.4 | — | 1.4 | 1.4 | — | 1.4 | 1.4 | 1.4 | 1.4 |
| | Cooling roller temperature (° C.) | 30 | — | 30 | 30 | — | 30 | 30 | 30 | 30 |
| Stretching in a direction transverse to the machine direction | Pre-heating temperature (° C.) | 92 | 92 | 92 | 92 | 92 | 88 | 92 | 92 | 88 |
| | Stretching temperature (° C.) | 70 | 70 | 67 | 67 | 67 | 62 | 67 | 70 | 62 |
| | Stretching ratio | 4.9 | 4.9 | 4.9 | 4.9 | 4.9 | 4.9 | 4.9 | 4.9 | 4.9 |
| | Annealing temperature (° C.) | 60 | 60 | 60 | 60 | 60 | 57 | 60 | 60 | 57 |

"—": not applied

TABLE 5

| | | Heat-shrinkable polyester label film | | | | | | | |
|---|---|---|---|---|---|---|---|---|---|
| | | CE1 | CE2 | CE3 | CE4 | CE5 | CE6 | CE7 | CE8 |
| Polyester resins (wt %) | PE1 | 100 | 90 | 0 | 65 | 70 | 67 | 0 | 0 |
| | PE2 | 0 | 0 | 18 | 35 | 0 | 18 | 0 | 0 |
| | PE3 | 0 | 10 | 0 | 0 | 30 | 15 | 0 | 0 |
| | PE5 | 0 | 0 | 82 | 0 | 0 | 0 | 0 | 0 |
| | PE9 | 0 | 0 | 0 | 0 | 0 | 0 | 100 | 0 |
| | PE10 | 0 | 0 | 0 | 0 | 0 | 0 | 0 | 100 |
| Dibasic carboxylic mixture (mol %) | Terephthalic acid | 100 | 97.1 | 100 | 100 | 91.5 | 95.6 | 95.6 | 86 |
| | Adipic acid | 0 | 2.9 | 0 | 0 | 8.5 | 4.4 | 0 | 0 |
| | Isophthalic acid | 0 | 0 | 0 | 0 | 0 | 0 | 4.4 | 0 |
| | Dodecanedioic acid | 0 | 0 | 0 | 0 | 0 | 0 | 0 | 14 |
| Diol mixture (mol %) | Ethylene glycol | 78.7 | 81.0 | 62.4 | 52.8 | 85.5 | 69.2 | 69.2 | 100 |
| | Diol component | Neopentyl glycol | 21.3 | 19.0 | 16.6 | 14.2 | 14.5 | 14.3 | 14.3 | 0 |
| | | 1,4-butanediol | 0 | 0 | 16.8 | 33.0 | 0 | 16.5 | 16.5 | 0 |
| | | Diethylene glycol | 0 | 0 | 4.2 | 0 | 0 | 0 | 0 | 0 |
| | | Total amount | 21.3 | 19.0 | 37.6 | 47.2 | 14.5 | 30.8 | 30.8 | 0 |

TABLE 6

| | | Heat-shrinkable polyester label film | | | | | | | |
|---|---|---|---|---|---|---|---|---|---|
| | | CE1 | CE2 | CE3 | CE4 | CE5 | CE6 | CE7 | CE8 |
| Not yet stretched polyester sheet | Thickness (μm) | 196 | 196 | 275 | 196 | 245 | 275 | 196 | 275 |
| | Glass transition temperature (° C.) | 75 | 69 | 62 | 62 | 61 | 57 | 66 | 50 |
| Stretching in machine direction | Pre-heating temperature (° C.) | — | — | 66 | — | 66 | 62 | — | 55 |
| | First rotating roller temperature (° C.) | — | — | 66 | — | 66 | 62 | — | 55 |
| | Second rotating roller temperature (° C.) | — | — | 30 | — | 30 | 30 | — | 30 |
| | Stretching ratio | — | — | 1.4 | — | 1.25 | 1.4 | — | 1.4 |
| | Cooling roller temperature (° C.) | — | — | 30 | — | 30 | 30 | — | 30 |
| Stretching in a direction transverse to the machine direction | Pre-heating temperature (° C.) | 98 | 92 | 92 | 92 | 92 | 92 | 92 | 88 |
| | Stretching temperature (° C.) | 83 | 77 | 70 | 70 | 70 | 75 | 77 | 62 |
| | Stretching ratio | 4.9 | 4.9 | 4.9 | 4.9 | 4.9 | 4.9 | 4.9 | 4.9 |
| | Annealing temperature (° C.) | 76 | 70 | 60 | 60 | 60 | 70 | 70 | 57 |

"—": not applied

Property Evaluation for Heat-Shrinkable Polyester Label Film

1. Glass Transition Temperature (Tg) and Enthalpy (Hm)

The polyester sheets that are not yet stretched and the heat-shrinkable polyester label films of EX1 to EX9 and CE1 to CE8 were subjected to Tg measurement. Specifically, the respective sheet or label film was analyzed with differential scanning calorimeter (DSC) (Manufacturer: TA Instruments, Inc.; Model: 2910 Modulated DSC™), in which the test temperature was raised from −50° C. to 300° C. at a heating rate of 10° C./minute. The glass transition temperature, the endothermic peak area, and the exothermic peak area were determined from the heat capacity-temperature variation curve, while the enthalpy (Hm) was calculated using the following Equation (I):

$$Hm = |\text{enthalpy of fusion} - \text{enthalpy of crystallization}| \quad (I)$$

The results are shown in Tables 7 and 8.

2. Natural Shrinkage Rate After Aging

A respective one of the heat-shrinkable polyester label films of EX1 to EX9 and CE1 to CE8 was cut into a test sample having a dimension of 100 mm (in a machine direction [MD])×100 mm (in a direction transverse to the machine direction [TD]). Namely, the test sample had an original length of 100 mm in both the MD and TD. Next, the test sample was placed in a hot air oven at 40° C. and a relative humidity of 40% for 672 hours, so as to induce aging. The natural shrinkage rate of the test sample after aging in the MD and TD was calculated using the following Equations (II) and (III):

$$S_{aging} \text{ in TD (\%)} = [(100 - L_{TD})/100] \times 100\% \quad (II)$$

$$S_{aging} \text{ in MD (\%)} = [(100 - L_{MD})/100] \times 100\% \quad (III)$$

The results are shown in Tables 7 and 8.

3. Heat Shrinkage Rate at 55° C.

The heat shrinkage rate of the heat-shrinkable polyester label films of EX1 to EX9 and CE1 to CE8 was measured according to JIS 21709. Briefly, the respective heat-shrinkable polyester label film was cut into a test sample having a dimension of 100 mm (in the MD)×100 mm (in the TD). Namely, the test sample had an original length of 100 mm in both the MD and TD. Next, the test sample was immersed in water at 55° C. for a respective time period of 10 seconds, 30 seconds, 60 seconds and 240 seconds, and was then removed from the water, followed by cooling in cold water at 25° C. Thereafter, the test sample was subjected to measurement of the length in the MD ($L_{MD}$) and the length in the TD ($L_{TD}$). The heat shrinkage rate of the test sample in the MD and TD after immersion in water at 55° C. for the respective time period was calculated using the following Equations (IV) and (V):

$$S_{55°C.} \text{ in TD (\%)} = [(100 - L_{TD})/100] \times 100\% \quad (IV)$$

$$S_{55°C.} \text{ in MD (\%)} = [(100 - L_{MD})/100] \times 100\% \quad (V)$$

The results are shown in Tables 7 and 8.

4. Heat Shrinkage Rate at 95° C.

The heat shrinkage rate of the heat-shrinkable polyester label films was measured according to JIS Z1709. Briefly, a respective one of the heat-shrinkable polyester label films of EX1 to EX9 and CE1 to CE8 was cut into a test sample having a dimension of 100 mm (in the MD)×100 mm (in the TD). Namely, the test sample had an original length of 100 mm in both the MD and TD. Next, the test sample was subjected to immersion in hot water at 95° C. for 10 seconds, and was then removed from the hot water, followed by cooling in cold water at 25° C. Thereafter, the test sample was subjected to measurement of the length in the MD ($L_{MD}$) and the length in the TD ($L_{TD}$). The heat shrinkage rate of the test sample in the MD and TD after immersion in hot water at 95° C. for 10 seconds was calculated using the following Equations (VI) and (VII):

$$S_{95°C.} \text{ in TD (\%)} = [(100 - L_{TD})/100] \times 100\% \quad (VI)$$

$$S_{95°C.} \text{ in MD (\%)} = [(100 - L_{MD})/100] \times 100\% \quad (VII)$$

The results are shown in Tables 7 and 8.

5. Shrinkage Force at 55° C. without Aging

The heat-shrinkable polyester label films were each cut into a test sample having a length of 18 mm in the MD and a length of 150 mm in the TD. Next, two ends of the test sample in the TD were fixed using a clamping tool of a tensile testing machine (Manufacturer: Jobho Co., Ltd., Model No.: JH-690) that has a constant temperature water tank, followed by immersing the test sample in water at 55° C. for 180 seconds at a speed of 800 mm/min from a distance of 200 mm from the constant temperature water tank, so as to obtain a shrinkage force versus time curve. The shrinkage force at 55° C. of the heat-shrinkable polyester label film which corresponds to 30 seconds of immersion in the water was determined from the thus obtained curve.

6. Shrinkage Force at 55° C. with Aging

The shrinkage force of the heat-shrinkable polyester label films of EX1 to EX9 and CE1 to CE8 at 55° C. with accelerated aging was determined generally according to the procedures and conditions described in section 5 above, except that the respective test sample was subjected to accelerated aging by placing in the hot air oven at 40° C. and a relative humidity of 40% for 672 hours before use of the tensile testing machine and the immersion in water for determining the shrinkage force.

7. Detachability at 55° C. without Aging

A water-based adhesive containing 45 wt % of styrene-butadiene rubber, 40 wt % of an acrylic emulsion, 10 wt % of an ethylene-vinyl emulsion, 0.8 wt % of sodium hydroxide, 0.1% of disinfectant, and 4.1% of water was coated on a respective one of the heat-shrinkable polyester label films of EX1 to EX9 and CE1 to CE8 so as to form a test sample having an adhesive layer with a thickness of 5 μm. Next, the test sample was attached onto the bottle body of a 600-mL polyethylene terephthalate (PET) bottle. Then, the surface of the test sample was pressed using a rubber roller at a pressure of 3 kg/cm², and the rubber roller was rolled back and forth on the surface of the test sample 10 times, so that the test sample was firmly attached to the bottle body. Thereafter, the test sample was left to stand at 25° C. for 48 hours so as to allow the adhesive layer thereof to be cured and firmly attached to the bottle body of the PET bottle. For each of the heat-shrinkable polyester label films of EX1 to EX9 and CE1 to CE8, the aforesaid procedures were repeated 499 times so as to form 500 PET bottles each having the test sample attached thereto. Subsequently, the 500 PET bottles each having the test sample were immersed in a constant temperature water tank that was filled with water at 55° C. for 240 seconds, followed by removing the same from the water. After that, the number of PET bottles with the test sample attached to the bottle body was recorded, and the detachability of the test sample after immersion in water at 55° C. for 240 seconds was calculated using the following Equations (VIII):

$$\text{Detachability (\%)} = [(500 - \text{number of PET bottles with test sample attached thereto})/500] \times 100\% \quad (VIII)$$

The results are shown in Tables 7 and 8.

8. Detachability at 55° C. with Aging

The detachability of the heat-shrinkable polyester label films of EX1 to EX9 and CE1 to CE8 at 55° C. after accelerated aging was determined generally according to the procedures and conditions described in section 7 above, except that the PET bottles each having the test sample attached thereto were subjected to accelerated aging by placing in an oven at 40° C. for 144 hours before the immersion in water for determining the detachability.

9. Detachability at 80° C. without Aging

The detachability of a respective one of the heat-shrinkable polyester label films of EX1 to EX9 and CE1 to CE8 at 80° C. without accelerated aging was determined generally according to the procedures and conditions described in section 7 above, except that the PET bottles each having the test sample attached thereto were immersed in the constant temperature water tank that was filled with water at 80° C. for 120 seconds.

TABLE 7

| Property evaluation | | Heat-shrinkable polyester label film | | | | | | | | |
|---|---|---|---|---|---|---|---|---|---|---|
| | | EX1 | EX2 | EX3 | EX4 | EX5 | EX6 | EX7 | EX8 | EX9 |
| Glass transition temperature, Tg (° C.) | | 59.0 | 59.7 | 57.0 | 56.5 | 56.7 | 50.2 | 58.1 | 62.0 | 50.9 |
| Enthalpy, Hm (J/g) | | 12.3 | 10.7 | 10.6 | 10.1 | 9.8 | 8.5 | 11.0 | 12.5 | 10.6 |
| Natural heat shrinkage rate after aging (%) | Direction transverse to machine direction (TD) | 1.4 | 1.0 | 1.0 | 1.0 | 1.2 | 3.2 | 1.2 | 1.3 | 3.1 |
| | Machine direction (MD) | 0.9 | 0.5 | 1.1 | 1.0 | 0.6 | 2.5 | 1.1 | 1.0 | 2.6 |
| Heat shrinkage rate (%) at 55° C. | 10 sec | 15.3 | 10.4 | 27.1 | 27.3 | 27.4 | 48.1 | 25.0 | 17.2 | 49.0 |
| | 30 sec | 29.3 | 28.4 | 45.1 | 45.6 | 46.1 | 51.0 | 44.1 | 31.0 | 50.8 |
| | 60 sec | 41.4 | 39.9 | 51.9 | 52.0 | 52.0 | 56.0 | 50.7 | 43.0 | 56.2 |
| Heat shrinkage rate (%) at 55° C., 240 seconds | TD | 52.0 | 51.2 | 57.1 | 57.5 | 57.3 | 62.3 | 56.7 | 53.5 | 62.5 |
| | MD | 10.7 | 1.7 | 12.1 | 12.3 | 1.8 | 16.2 | 12.0 | 11.2 | 16.3 |
| Heat shrinkage rate (%) at 95° C., 10 s | TD | 69.3 | 69.7 | 72.4 | 72.8 | 73.1 | 69.1 | 72.1 | 71.0 | 69.4 |
| | MD | 23.3 | 5.1 | 24.5 | 25.0 | 5.8 | 25.2 | 24.3 | 24.0 | 24.8 |
| Shrinkage force (N) at 55° C., 30 s | Without aging | 6.7 | 7.0 | 6.2 | 6.4 | 6.6 | 6.2 | 6.3 | 6.9 | 6.0 |
| | With aging | 6.0 | 6.8 | 5.7 | 5.7 | 6.0 | 5.6 | 6.0 | 6.5 | 5.7 |
| Detachability (%) at 55° C., 240 s | Without aging | 98 | 98 | 97 | 97 | 98 | 97 | 97 | 97 | 98 |
| | With aging | 97 | 98 | 96 | 96 | 97 | 96 | 97 | 96 | 97 |
| Detachability (%) at 80° C., 120 seconds | Without aging | 100 | 100 | 100 | 100 | 100 | 100 | 100 | 100 | 100 |

TABLE 8

| Property evaluation | | Heat-shrinkable polyester label film | | | | | | | |
|---|---|---|---|---|---|---|---|---|---|
| | | CE1 | CE2 | CE3 | CE4 | CE5 | CE6 | CE7 | CE8 |
| Glass transition temperature, Tg (° C.) | | 75.0 | 68.8 | 62.0 | 61.7 | 61.1 | 57.0 | 66.4 | 50.1 |
| Enthalpy, Hm (J/g) | | 4.6 | 5.9 | 11.1 | 21.2 | 6.9 | 15.1 | 10.2 | 25.0 |
| Natural heat shrinkage rate after aging (%) | Direction transverse to machine direction (TD) | 0.1 | 0.2 | 1.0 | 0.6 | 1.0 | 0.9 | 1.0 | 2.5 |
| | Machine direction (MD) | 0.1 | 0.1 | 0.9 | 0.1 | 0.5 | 0.6 | 0.5 | 2.2 |
| Heat shrinkage rate (%) at 55° C. | 10 sec | 0.5 | 0.4 | 4.9 | 0 | 28.5 | 14.1 | 0.6 | 4.2 |
| | 30 sec | 1.1 | 1.2 | 15.7 | 0 | 44.2 | 27.5 | 1.5 | 13.8 |
| | 60 sec | 2.2 | 8.1 | 26.8 | 17.0 | 51.0 | 38.9 | 10.1 | 20.2 |
| Heat shrinkage rate (%) at 55° C., 240 seconds | TD | 14.7 | 34.9 | 46.0 | 38.3 | 58.8 | 50.1 | 35.2 | 28.6 |
| | MD | 1.2 | 0 | 9.2 | 1.5 | 0.7 | 10.1 | 0 | 0.2 |

TABLE 8-continued

| Property evaluation | | Heat-shrinkable polyester label film | | | | | | | |
|---|---|---|---|---|---|---|---|---|---|
| | | CE1 | CE2 | CE3 | CE4 | CE5 | CE6 | CE7 | CE8 |
| Heat shrinkage rate (%) at 95° C., 10 seconds | TD | 77.4 | 77.0 | 69.7 | 61.0 | 71.7 | 65.0 | 73.0 | 31.0 |
| | MD | 1.6 | 1.0 | 20.1 | 4.4 | 8.5 | 20.0 | 1.0 | 2.3 |
| Shrinkage force (N) at 55° C., 30 seconds | Without aging | 4.9 | 3.6 | 6.7 | 6.0 | 3.2 | 5.3 | 3.8 | 3.6 |
| | With aging | 4.7 | 3.3 | 6.1 | 5.5 | 3.0 | 4.5 | 3.4 | 3.2 |
| Detachability (%) at 55° C., 240 seconds | Without aging | 0 | 0 | 80 | 75 | 82 | 93 | 0 | 0 |
| | With aging | 0 | 0 | 79 | 73 | 80 | 90 | 0 | 0 |
| Detachability (%) at 80° C., 120 seconds | Without aging | 98 | 100 | 100 | 100 | 100 | 100 | 100 | 0 |

As shown in Table 7, each of the heat-shrinkable polyester label films of EX1 to EX9, by including the chain hydrocarbon dicarboxylic acid compound in an amount greater than 0 mol % and not greater than 7 mol % based on the total molar amount of the dibasic carboxylic mixture, exhibited a glass transition temperature ranging from 50° C. to 65° C., an enthalpy of not greater than 15 J/g, a shrinkage force of not lower than 5.5 N after immersion in water at 55° C. for 30 seconds, and a heat shrinkage rate of not lower than 50% after immersion in water at 55° C. for 240 seconds, indicating that: the heat-shrinkable polyester label films of EX1 to EX9 have an excellent heat shrinkage rate; and thus, after immersion in water at 55° C. for 240 seconds, the heat-shrinkable polyester label films of EX1 to EX9 also have an excellent detachability.

The following discussion of the comparative examples is given with reference to Table 8.

In contrast, the heat-shrinkable polyester label film of CE1, which was prepared with reference to JP 3829353 B2, US 2013/0011587 A1 and U.S. Pat. No. 8,815,994 B2, did not contain the chain hydrocarbon dicarboxylic acid compound, resulting in a glass transition temperature being greater than 65° C., a shrinkage force after immersion in water at 55° C. for 30 seconds being lower than 5.5 N (i.e., a poor shrinkage force), and a heat shrinkage rate in the TD after immersion in water at 55° C. for 240 seconds being 14.7% (i.e., a poor heat shrinkage rate). Thus, the heat-shrinkable polyester label film of CE1 exhibited a poor detachability after immersion in water at 55° C. for 240 seconds.

The heat-shrinkable polyester label film of CE2 exhibited a high glass transition temperature, a low shrinkage force (i.e., not greater than 5.5 N) after immersion in water at 55° C. for 30 seconds, as well as poor heat shrinkage rate after immersion in water at 55° C. for 10 seconds, 30 seconds, 60 seconds and 240 seconds. Thus, the heat-shrinkable polyester label film of CE2 exhibited a poor detachability after immersion in water at 55° C. for 240 seconds.

The heat-shrinkable polyester label film of CE3 did not contain the chain hydrocarbon dicarboxylic acid compound, resulting in poor heat shrinkage rate after immersion in water at 55° C. for 10 seconds, 30 seconds, 60 seconds and 240 seconds, and thus, the heat-shrinkable polyester label film of CE3 exhibited a poor detachability after immersion in water at 55° C. for 240 seconds.

The heat-shrinkable polyester label film of CE4, which did not contain the chain hydrocarbon dicarboxylic acid compound, exhibited an enthalpy greater than 15 J/g, as well as poor heat shrinkage rate after immersion in water at 55° C. for 10 seconds, seconds, 60 seconds and 240 seconds. Thus, the heat-shrinkable polyester label film of CE4 exhibited a poor detachability after immersion in water at 55° C. for 240 seconds.

The heat-shrinkable polyester label film of CE5, since an amount of the chain hydrocarbon dicarboxylic acid compound is greater than 7 mol % based on the total molar amount of the dibasic carboxylic mixture, exhibited a shrinkage force weaker than 5.5 N after immersion in water at 55° C. for 30 seconds. Thus, the heat-shrinkable polyester label film of CE5 exhibited a poor detachability after immersion in water at 55° C. for 240 seconds.

The heat-shrinkable polyester label film of CE6, which was prepared using a temperature that was too high during the second annealing treatment, exhibited a shrinkage force less than 5.5 N after immersion in water at 55° C. (measured after the aging was conducted or not). Moreover, the difference between the shrinkage force with aging or that without aging after immersion in water at 55° C. was large, and thus, the heat-shrinkable polyester label film of CE6 exhibited a poor detachability after immersion in water at 55° C. for 240 seconds.

The heat-shrinkable polyester label film of CE7, which was prepared using isophthalic acid instead of the chain hydrocarbon dicarboxylic acid compound, exhibited a glass transition temperature greater than 65° C., as well as a shrinkage force smaller than 5.5 N after immersion in water at 55° C. for 30 seconds and a heat shrinkage rate of smaller than 50% after immersion in water at 55° C. for 240 seconds. Thus, the heat-shrinkable polyester label film of CE7 exhibited a poor detachability after immersion in water at 55° C. for 240 seconds.

The heat-shrinkable polyester label film of CE8 (corresponding to Example 2 of U.S. Pat. No. 5,070,180 A), which was prepared without a diol component free from ethylene glycol and with an amount of the chain hydrocarbon dicarboxyluc acid compound being greater than 7 mol % based on the total molar amount of the dibasic carboxylic mixture, exhibited a high enthalpy, as well as a shrinkage force smaller than 5.5 N after immersion in water at 55° C. for 30 seconds and a heat shrinkage rate of smaller than 50% after immersion in water at 55° C. for 240 seconds. Thus, the heat-shrinkable polyester label film of CE8 exhibited a poor detachability after immersion in water at 55° C. for 240 seconds.

In summary, by virtue of the sufficient shrinkage force and heat shrinkage rate, and further by virtue of the particular component and its specific amount, as well as the proper glass transition temperature and enthalpy, the heat-shrinkable polyester label film of the present disclosure, when attached to a container, can be detached therefrom after immersion in a washing liquid at 50° C. or higher, and thus, is conferred with an excellent detachability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A heat-shrinkable polyester label film, having:
    a shrinkage force of not lower than 5.5 N in at least one shrinkage direction after immersing the heat-shrinkable polyester label film in water at 55° C. for 30 seconds; and
    a heat shrinkage rate of not lower than 50% in the shrinkage direction after immersing the heat-shrinkable polyester label film in water at 55° C. for 240 seconds.

2. The heat-shrinkable polyester label film of claim 1, having a heat shrinkage rate of not lower than 5% in the shrinkage direction after immersing the heat-shrinkable polyester label film in water at 55° C. for 10 seconds; and
    a heat shrinkage rate of not lower than 20% in the shrinkage direction after immersing the heat-shrinkable polyester label film in water at 55° C. for 30 seconds.

3. The heat-shrinkable polyester label film of claim 1, having a heat shrinkage rate of not lower than 65% in the shrinkage direction after immersing the heat-shrinkable polyester label film in water at 95° C. for 10 seconds.

4. The heat-shrinkable polyester label film of claim 1, having a shrinkage force ranging from 5.5 N to 10 N in the shrinkage direction, after immersing the heat-shrinkable polyester label film in water at 55° C. for 30 seconds.

5. The heat-shrinkable polyester label film of claim 1, having a natural shrinkage rate after aging of not greater than 3.2%, after placing the heat-shrinkable polyester label film at 40° C. and a relative humidity of 40% for 672 hours.

6. The heat-shrinkable polyester label film of claim 1, having a glass transition temperature ranging from 50° C. to 65° C.

7. A heat-shrinkable polyester label film comprising a polyester material made of a polyester-forming composition which includes a dibasic carboxylic mixture and a diol mixture,
    wherein the heat-shrinkable polyester label film has a glass transition temperature ranging from 50° C. to 65° C., an enthalpy not greater than 15 J/g, and a shrinkage force not lower than 5.5 N in at least one shrinkage direction, after immersing the heat-shrinkable polyester label film in water at 55° C. for 30 seconds;
    wherein the dibasic carboxylic mixture includes a dibasic carboxylic compound and a chain hydrocarbon dicarboxylic acid compound, the dibasic carboxylic compound is one of terephthalic acid and dimethyl terephthalate, the chain hydrocarbon dicarboxylic acid compound being present in an amount greater than 0 mol % and not greater than 7 mol %, based on a total molar amount of the dibasic carboxylic mixture; and
    wherein the diol mixture includes ethylene glycol and a diol component that is free from ethylene glycol.

8. The heat-shrinkable polyester label film as claimed in claim 7, wherein the chain hydrocarbon dicarboxylic acid compound is selected from the group consisting of a linear hydrocarbon dicarboxylic acid compound, a branched hydrocarbon dicarboxylic acid compound, and a combination thereof.

9. The heat-shrinkable polyester label film as claimed in claim 8, wherein the linear hydrocarbon dicarboxylic acid compound is selected from the group consisting of adipic acid, succinic acid, azelaic acid, and combinations thereof.

10. The heat-shrinkable polyester label film as claimed in claim 7, wherein the diol component is selected from the group consisting of a diol having a linear hydrocarbon group or a linear hydrocarbon oxy group, a branched alkyl diol, and a combination thereof.

11. The heat-shrinkable polyester label film as claimed in claim 10, wherein the diol having a linear hydrocarbon group or a linear hydrocarbon oxy group is selected from the group consisting of 1,4-butanediol, 1,3-propanediol, hexanediol, diethylene glycol, triethylene glycol, polyethylene glycol, and combinations thereof.

12. The heat-shrinkable polyester label film as claimed in claim 10, wherein the branched alkyl diol is selected from the group consisting of neopentyl glycol, 2-methyl-1,3-propanediol, 2-butyl-2-ethyl-1,3-propanediol, and combinations thereof.

13. The heat-shrinkable polyester label film as claimed in claim 7, wherein the diol component is present in an amount not lower than 30 mol %, based on a total molar amount of the diol mixture.

14. The heat-shrinkable polyester label film as claimed in claim 7, having a shrinkage force ranging from 5.5 N to 10 N in the shrinkage direction, after immersing the heat-shrinkable polyester label film in water at 55° C. for 30 seconds.

15. The heat-shrinkable polyester label film as claimed in claim 7, having a natural heat shrinkage rate after aging of not greater than 3.2%, after placing the heat-shrinkable polyester label film at 40° C. and a relative humidity of 40% for 672 hours and allowing the heat-shrinkable polyester label film to spontaneously shrink.

16. The heat-shrinkable polyester label film as claimed in claim 7, having a glass transition temperature ranging from 56° C. to 62° C.

17. The heat-shrinkable polyester label film as claimed in claim 7, having a heat shrinkage rate of not lower than 50% in the shrinkage direction after immersing the heat-shrinkable polyester label film in water at 55° C. for 240 seconds.

18. The heat-shrinkable polyester label film as claimed in claim 7, having at least one property selected from the group consisting of:
   a heat shrinkage rate of not lower than 5% in the shrinkage direction after immersing the heat-shrinkable polyester label film in water at 55° C. for 10 seconds; and
   a heat shrinkage rate of not lower than 20% in the shrinkage direction after immersing the heat-shrinkable polyester label film in water at 55° C. for 30 seconds.

19. The heat-shrinkable polyester label film as claimed in claim 9, having a heat shrinkage rate of not lower than 65% in the shrinkage direction after immersing the heat-shrinkable polyester label film in water at 95° C. for 10 seconds.

glycol;
   (b) subjecting the polyester material to a melting treatment and an extruding treatment in sequence, so as to obtain a sheet; and
   (c) subjecting the sheet to preheating, stretching, and annealing treatments in sequence, so as to obtain the heat-shrinkable polyester label film, the annealing treatment being performed at a glass transition temperature of the sheet −5° C. to the glass transition temperature of the sheet +10° C.

20. A container, comprising a container body and a heat-shrinkable polyester label film as claimed in claim 1, which is attached to said container body.

* * * * *